M. H. KEYT.

METHOD OF REMOVING TARNISH FROM METALS.

APPLICATION FILED FEB. 14, 1913.

Reissued Feb. 16, 1915.

13,880.

Witnesses
W. K. Ford
C. B. Belknap

Inventor
Marshall H. Keyt
By Whittemore Hulbert & Whittemore
Attys

UNITED STATES PATENT OFFICE.

MARSHALL H. KEYT, OF CHICAGO, ILLINOIS.

METHOD OF REMOVING TARNISH FROM METALS.

13,880. Specification of Reissued Letters Patent. Reissued Feb. 16, 1915.

Original No. 937,154, dated October 19, 1909, Serial No. 462,295. Application for reissue filed February 14, 1913. Serial No. 748,481.

*To all whom it may concern:*

Be it known that I, MARSHALL H. KEYT, a citizen of the United States of America, residing at Chicago, in the county of Cook and State of Illinois, have invented certain new and useful Improvements in Methods of Removing Tarnish from Metals, of which the following is a specification, reference being had therein to the accompanying drawings.

The invention relates to a process or method of brightening metals by removing tarnish therefrom, and consists in the novel steps of the process as will be hereinafter set forth.

Primarily, the method consists in immersing the metal from which the tarnish is to be removed in an electrolyte in which is immersed a metal of a more positive electrical character. The method is applicable in brightening all kinds of metals, but for the purpose of illustration it will be described in the removal of tarnish from silver.

The invention further consists in a novel construction of apparatus for carrying out the method.

Figure 1:
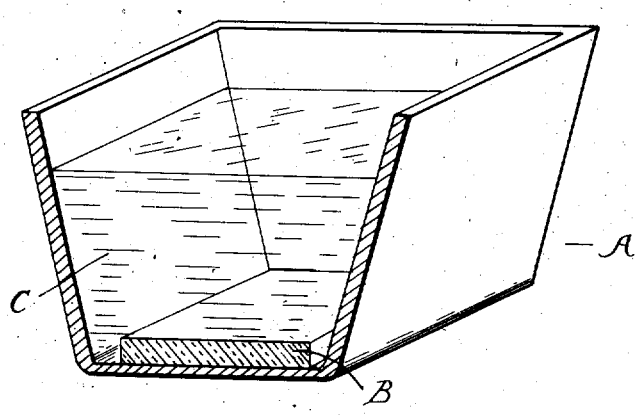
Figure 2:
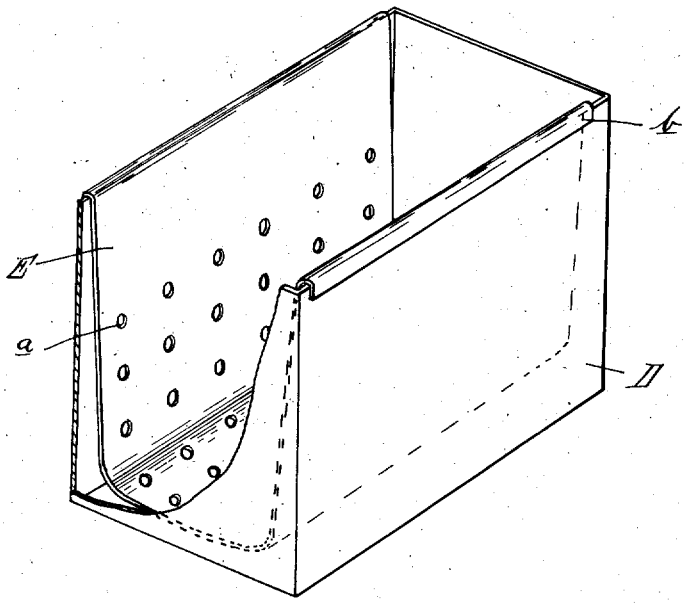

In the drawings: Figures 1 and 2 represent apparatus suitable for carrying out the steps of the process, Fig. 1 being a sectional perspective view and Fig. 2 a modified form of apparatus.

The reference-letter A (Fig. 1) designates a receptacle of any suitable type, and B a metal plate or sheet therein, the metal being preferably zinc.

C designates the electrolyte, a solution containing carbonate of soda, bicarbonate of soda, and sodium sulfate. The preferred proportions of the ingredients are: two parts, by weight, of the carbonate; two parts of the bicarbonate; and one part of the sulfate. These ingredients are intimately mixed and preferably poured into the water within the receptacle forming the solution, the water being preferably at the boiling point to produce the best results. The silver or other metal to be brightened is immersed in the electrolyte, and the tarnish disappears in practice very shortly after the immersion is effected, in most instances merely a dipping of the article being required. As understood, an electrolytic action takes place, the tarnish upon the silver or other immersed metal disappearing, and a tarnish or coating appearing upon the zinc within the bath. To obtain satisfactory results it is essential that the tarnish upon the metal having the higher positive electrical characteristics be removed and the metal kept bright during the carrying out of the method.

In Fig. 2 a modified form of apparatus is illustrated—especially designed for use in removing the tarnish from silverware, such as knives, forks, and the like. It comprises a receptacle D, made entirely of zinc, and a holder for the articles or utensils E in the form of a U-shaped tray, the major portion of the tray being apertured, as at *a*, and the end portions *b* being folded over to form hooks by means of which the tray is suspended from the edges of the receptacle within the electrolyte. With apparatus of this character, the articles may be first deposited upon the tray, afterward submerged, and finally withdrawn, the electrolyte draining off through the apertures. Thus, the removing of the tarnish may be effected without the necessity of the hands of the operator being placed within the electrolyte.

As previously pointed out, the method may be carried out in brightening metals of all kinds, and it is to be understood that other metals than zinc may be employed as the constantly-immersed electrode. Zinc is preferable, however, as the reaction is more rapid, with the result that the time required for carrying out the process is reduced to a minimum.

Attention is further directed to the fact that whereas the electrolytic action will take place upon merely dipping the metal to be brightened within the electrolyte, the operation is materially hastened by bringing the tarnished metal into direct contact with the positive electrode after immersion. The construction of apparatus shown in Fig. 2 of the drawings is especially applicable for this purpose, the articles being adapted to contact directly with the zinc tray, or may contact one with another and finally with a tray.

I am aware that soda salts have been employed heretofore as the active agent of an electrolyte, but the particular combination of salts set forth above is believed to be novel and superior to any other composition heretofore used in that it is capable of effecting a rapid reaction, and the electrolyte remains active for a maximum period of time.

What I claim as my invention is,—

1. The herein-described process for removing tarnish from metals consisting in immersing the metal to be brightened in an electrolyte consisting of sodium carbonate, sodium bicarbonate, and sodium sulfate, in solution, in which is immersed a metal of a more positive electrical character, and in bringing the metal to be brightened after immersion into electrical contact with the more positive metal.

2. The herein-described process for removing tarnish from metals, consisting in removing tarnish or corrosion from a portion of the surface of an electrode having a more positive electrical character than the metal to be brightened, placing said electrode and the metal to be brightened in an alkaline electrolyte, and in establishing electrical connection between said surface from which the tarnish has been removed and the metal to be brightened.

3. The herein-described process for removing tarnish from metals, consisting in selecting as an electrode a metal having a more positive electrical character than the metal to be brightened, maintaining on a portion of said electrode a surface free from tarnish or corrosion, immersing said electrode and the metal to be brightened in an alkaline electrolyte, and in establishing electrical connection between the brightened surface of the electrode and the metal to be brightened.

4. The herein-described process for removing tarnish from metals, consisting in removing tarnish or corrosion from a portion of the surface of a zinc electrode, placing said electrode and the metal to be brightened in an alkaline electrolyte, and in bringing the bright surface of the zinc in contact with the metal to be brightened.

In testimony whereof I affix my signature in presence of two witnesses.

MARSHALL H. KEYT.

Witnesses:
JAMES P. BARRY,
PHYLLIS COBURN.